United States Patent [19]
Takeuchi et al.

[11] Patent Number: 4,682,166
[45] Date of Patent: Jul. 21, 1987

[54] SET POINT CHANGE-OVER CIRCUIT FOR FLUID CONTROL VALVES

[75] Inventors: Kunihiko Takeuchi, Kawasaki; Fujio Baba; Yasuo Shimomura, both of Tokyo; Yuji Morishige, Funabashi, all of Japan

[73] Assignee: Tokyo Keiki Company Limited, Tokyo, Japan

[21] Appl. No.: 796,410

[22] Filed: Nov. 8, 1985

[30] Foreign Application Priority Data

Nov. 8, 1984 [JP] Japan ................. 59-234050

[51] Int. Cl.⁴ ............ H04Q 1/00; G05B 15/02; G05B 11/01; G06G 7/57
[52] U.S. Cl. ............... 340/825.5; 364/510; 364/139; 364/140
[58] Field of Search ........... 340/825.5, 825.51, 825.06; 364/138, 139, 140, 152, 154, 510; 137/2, 8, 487.5; 370/85

[56] References Cited

U.S. PATENT DOCUMENTS

| | | | |
|---|---|---|---|
| 3,886,418 | 5/1976 | Austin et al. | 364/139 |
| 4,176,395 | 11/1979 | Evelyn-Veere et al. | 364/510 |
| 4,417,312 | 11/1983 | Cronin et al. | 364/510 |
| 4,428,046 | 1/1984 | Chari et al. | 370/85 |
| 4,573,114 | 2/1986 | Ferguson et al. | 364/510 |
| 4,576,570 | 3/1986 | Adams et al. | 364/510 |
| 4,577,280 | 3/1986 | Putman | 364/510 |

*Primary Examiner*—Ulysses Weldon
*Assistant Examiner*—Ralph E. Smith
*Attorney, Agent, or Firm*—Fleit, Jacobson, Cohn & Price

[57] ABSTRACT

A circuit for change-over of electric signal set points applied as control inputs to a fluid control valve for controlling the pressure or flow rate of a fluid. A priority circuit including a priority encoder or priority chain is provided in an input section for set point select and change-over instruction signals from an external sequential controller. When two or more of the instruction signals are applied simultaneously, only the highest priority instruction is received to select the desired set point and the other instructions are ignored.

4 Claims, 4 Drawing Figures

SET POINT CHANGE-OVER CIRCUIT FOR FLUID CONTROL VALVES

BACKGROUND OF THE INVENTION

1. Field of the Invention

The present invention relates to a set point change-over circuit for analog-type or digital-type fluid control valves and more particularly to such set point change-over circuit so designed that the application of electric signal set point to a fluid control valve is changed over to one of a plurality of set points predetermined as fluid pressure or flow controlling references selected in accordance with the set point select instruction from an external control circuit such as a sequencer.

2. Description of the Prior Art

To effect the change-over between the set points of a fluid control valve of the type in which the fluid pressure or flow rate is controlled analogically or digitally in accordance with the magnitude of an electric input set point signal, it has been the usual practice in the past such that the change-over is effected by selecting desired one of a plurality of set points preliminarily set in setting means by a sequential controller. The sequential controller usually comprises a microcomputer, relays or the like and it is disadvantageous in that during the change-over from one set point to another the two set points are simultaneously applied to the control valve over a period of 1 to 2 ms or conversely there is a moment when neither of the set points is applied thus causing a non-input state. Thus, there are disadvantages that during the change-over period an unstable voltage is generated thus causing the fluid pressure or fluid flow rate to undergo a shock through the fluid control valve, that the absorption of such shock requires the provision of a waiting time or the use of the control valve with a degraded response characteristic through the provision of a first order lag circuit or the like and so on.

SUMMARY OF THE INVENTION

It is the primary object of the present invention to provide a set point change-over circuit for fluid control valves which is so designed that there is no danger of a plurality of set points being selected simultaneously or the application of any set point being interrupted momentarily in the course of the change-over.

In accordance with the invention there is thus provided a set point change-over circuit so designed that the application of set point to a fluid control valve is changed over to desired one of a plurality of preliminarily established set points selected in accordance with the set point select instruction from an external control circuit and the change-over circuit comprises a plurality of input means each having set therein a predetermined set point, output means for generating a set point to be applied to the fluid control valve, switching means responsive to the set point select instruction to select the desired set point to be applied to the fluid control valve from the set points preset in the input means in accordance with the set point select instruction, and priority circuit means for transmitting the set point select instruction from the external control circuit to the switching means, the priority circuit means being so adapted that when two or more set point select instructions are applied simultaneously only highest-priority one of the set point select instructions is transmitted to the switching means and the other instructions are ignored.

In one form of the priority circuit means, it comprises a priority encoder for receiving the set point select instruction from the external control circuit and a decoder for decoding the output of the encoder to control the switching of the switching means consisting for example of analog switches. In another form, the priority circuit means comprises a priority chain circuit consisting of a plurality of logic elements.

In accordance with the set point change-over circuit, if, for example, two or more set point select instructions are simultaneously applied momentarily from the external control circuit to the priority circuit means, only the highest-priority instruction is received and the other instructions are ignored thereby delivering only the highest-priority instruction as the desired set point. In accordance with the invention, the provision of the priority circuit means is effective in that if, for example, the controlled system operated at a high speed by a first set point select instruction is to be operated at a low speed by a second set point select instruction of a higher priority, the second set point select instruction is switched on with the first set point select instruction being switched on. Thus, the second set point select instruction of the higher priority is executed and then the first set point select instruction is switched off. In this way, the transition from the first set point select instruction to the second set point select instruction is effected without causing any unstable moment. Thus, there is no danger of both the first and second instructions failing to be established or the two instructions being established simultaneously thereby causing a shock on the movement of the fluid. This has the effect of eliminating the need to provide a waiting time for shock absorbing purposes or the need to use the control valve with a degraded response characteristic through the provision of a first order lag circuit.

It is to be noted that while, in the case of a recently developed digital control valve, the select number of each set point select instruction for a digital valve controller is designated by a coded select instruction and a data strobe so as to avoid any malfunction due to faulty change-over of a sequential controller, it is possible to operate the digital control valve in the similar manner as the previously mentioned analog control valve by arranging the input signal priority circuit means of the invention in the input section for the select instructions from the external sequential controller.

The above and other objects as well as advantageous features of the invention will become more clear from the following description taken in conjunction with the drawings.

DESCRIPTION OF THE PREFERRED EMBODIMENTS

Figure 4:
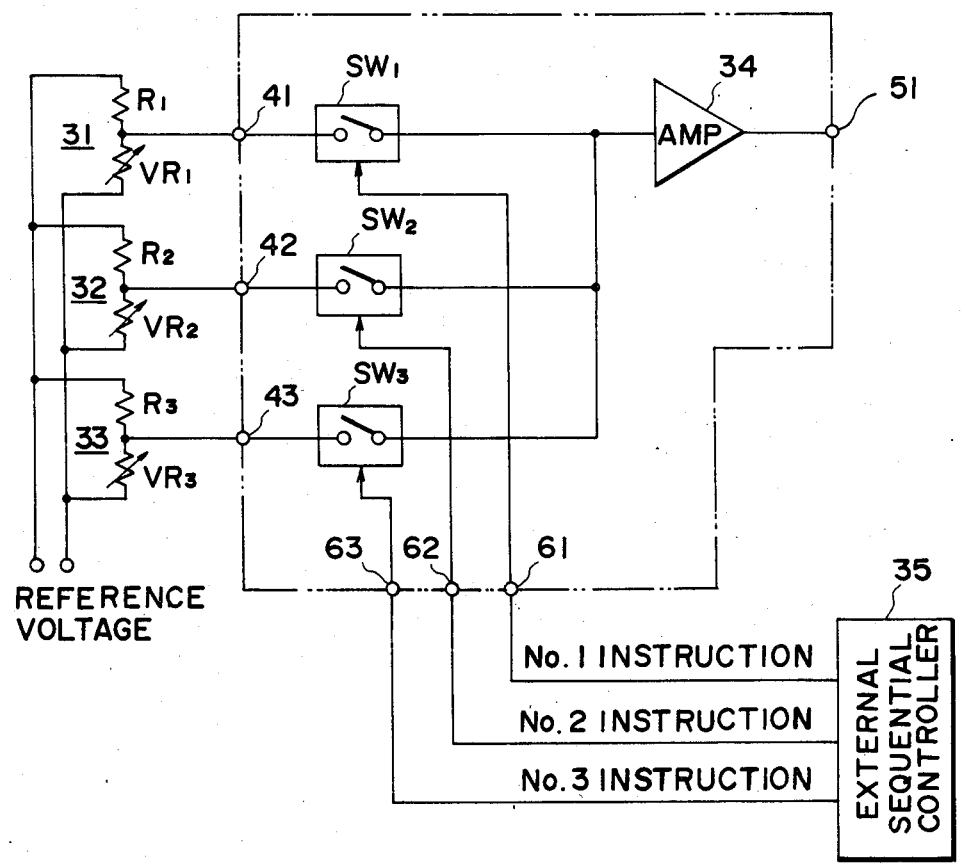
FIG. 4 is a block diagram of a conventional set point change-over circuit for a control valve.

Before describing the embodiments of the invention, a typical example of the conventional set point change-over circuit of this type will be described with reference to FIG. 4. In the Figure, numerals 31 to 33 designate setting means. The setting means 31 for a No. 1 set point includes a resistor $R_1$ and a variable resistor $VR_1$, the setting means 32 for a No. 2 set point includes a resistor $R_2$ and a variable resistor $VR_2$ and the setting means 33 for a No. 3 set point includes a resistor $R_3$ and a variable resistor $VR_3$. Numerals 41 to 43 designate input terminals for receiving the outputs of the setting means 31 to 33, respectively, and $SW_1$ to $SW_3$ analog switches respectively connected to the input terminals 41 to 43. The outputs of the analog switches $SW_1$ to $SW_3$ are applied in common to a buffer amplifier 34. The opening and closing of each of the analog switches $SW_1$ to $SW_3$ are controlled by the select instruction of the corresponding number applied to one of instruction signal input terminals 61 to 63 from an external sequential controller 35. Numeral 51 designates an output terminal of the buffer amplifier 34.

Assuming now that a No. n set point select instruction (e.g., the first set point select instruction) is generated from the external sequential controller 35, the corresponding analog switch SWn (e.g., the analog switch 31) is turned on and the other analog switches are turned off. Thus, the voltage preset by No. n setting means 3n (e.g., the setting means 31) is supplied to a power amplifier (not shown) from the output terminal 51 through the buffer amplifier 34 so that the fluid control valve is controlled so as to attain the flow rate or the pressure corresponding to the set point. At this time, the external sequential controller 35 successively changes over the preset pressures or flow rates in accordance with the control procedure of a hydraulic apparatus.

In this type of conventional set point change-over circuit, however, the external sequential controller 35 comprises a microcomputer or relays so that the complete change-over between the set point select instructions is impossible and a situation arises in which the No. n set point and the No. 2 set point are selected simultaneously over a period of 1 to 2 ms or none of these set points are selected.

Figure 1:
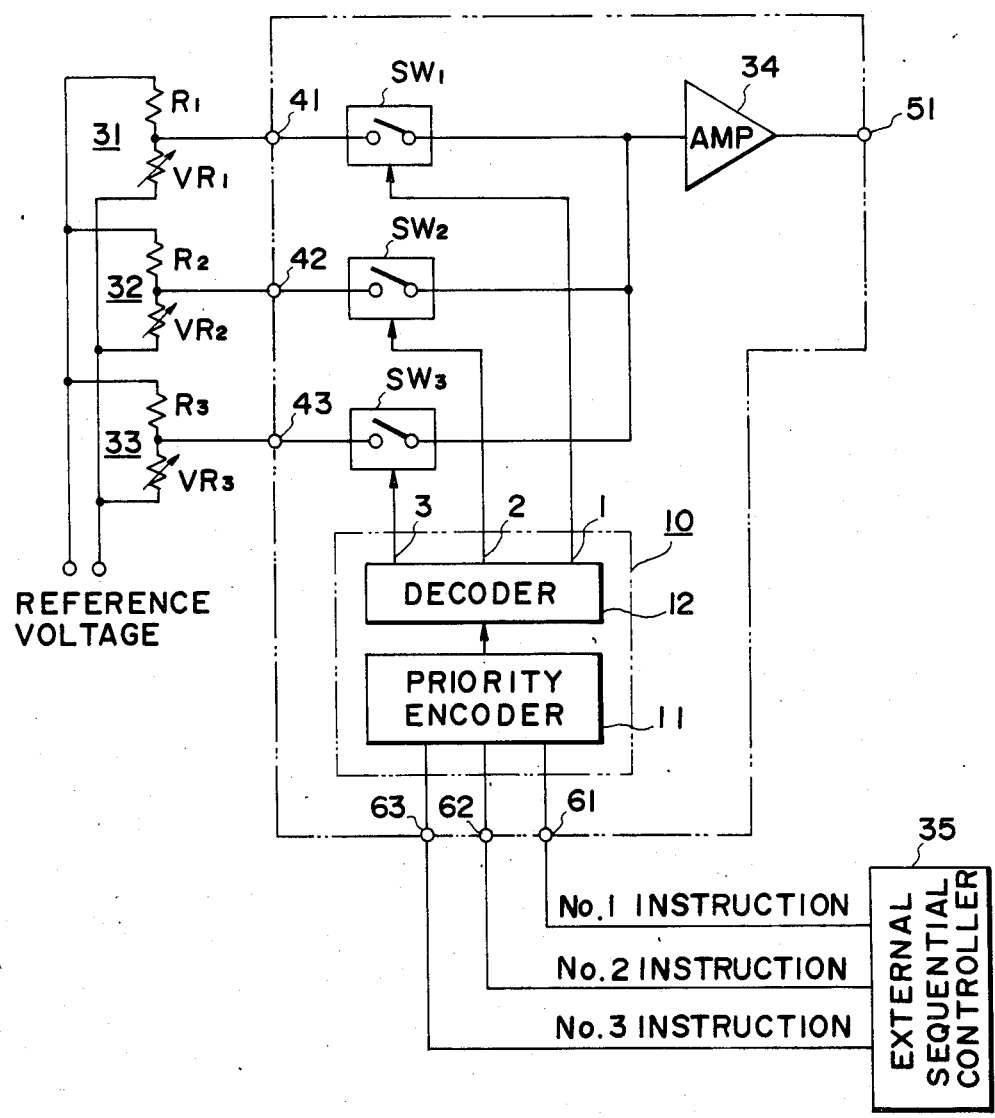
FIG. 1 is a block diagram of a set point change-over circuit for a control valve according to the present invention.

Referring to FIG. 1, there is illustrated a block diagram of a set point change-over circuit for control valves according to an embodiment of the invention. The component parts designated by the same reference numerals as in FIG. 4 show the same or equivalent parts and their explanation will be omitted.

In FIG. 1, numeral 10 designates an input signal priority circuit including a priority encoder 11 and a decoder 12. The priority encoder 11 is connected to the external sequential controller 35 and the output from the priority encoder 11 is applied to the decoder 12 whose outputs are each connected to the control terminal of corresponding one of the analog switches $SW_1$ to $SW_3$.

Figure 2:
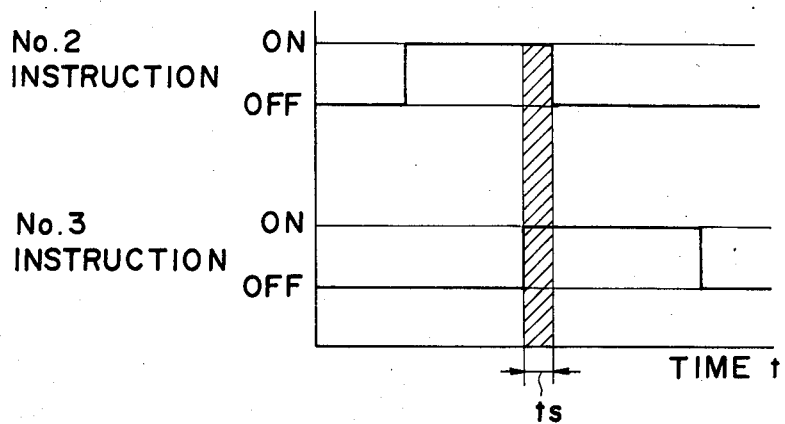
FIG. 2 is a time chart of the set point select instructions.

The operation of this embodiment will now be described. The set point select instruction from the external sequential controller 35 is applied to the priority encoder 11 where it is coded into a digital binary number, BCD code or the like. Where the connections are such that the priority of each set point select instruction is increased with an increase in its number, if the No. 2 set point select instruction and the No. 3 set point select instruction are for example applied simultaneously so that an unstable interval $t_s$ is caused as shown in FIG. 2, during the interval $t_s$ the No. 2 set point select instruction is ignored and the No. 3 set point select instruction is coded as "011". The coded select instruction is then applied to the decoder 12 which in turn decodes the code "011" and thus only the output terminal 3 is made true thereby turning on the analog switch $SW_3$ alone. At this time, the other analog switches $SW_1$ and $SW_2$ are off.

Thus, despite the simultaneous application of the No. 2 select instruction and the No. 3 select instruction during the interval $t_s$, the set point of the setting means 33 is preferentially delivered through the buffer amplifier 34 and the control valve is operated in accordance with the set point of the No. 3 set point select instruction thereby eliminating the occurrence of any unstable operation caused by the simultaneous application due to the poor response of the external sequential controller 35.

Figure 3:
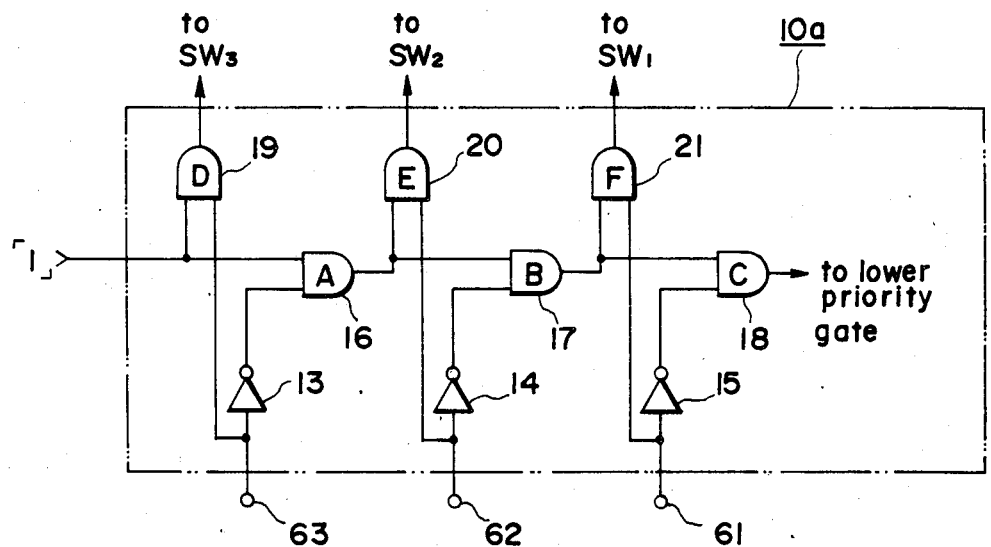
FIG. 3 is a circuit diagram of an input signal priority circuit according to another embodiment of the invention.

FIG. 3 is a block diagram showing only an input signal priority circuit 10a according to another embodiment of the invention and the circuit 10a comprises a priority chain by way of example. In the Figure, numerals 13 to 15 designate inverters, and 16 to 21 AND circuits forming gates A to F, respectively. In this embodiment, the highest priority is assigned to the gate A and a priority input $P_3$ is always true. When none of the No. 1 to No. 3 set point select instructions are present, "0" input signals are inverted by the inverters 13 to 15 so that the resulting "1" signals are applied to the gates A to C and the outputs of the gates A to C or the priority inputs $P_3$ to $P_1$ are all made true. Thus, all of the select instructions are acceptable. Assuming now that the No. 3 set point select instruction becomes true or "1", the gate A generates a false or "0" output and the outputs of the gates B and C simultaneously become false or "0" thereby inhibiting the outputs of the gates E and F. The logical product of the No. 3 set point select instruction and the priority input $P_3$ is obtained by the gate D and it is then delivered as a control signal for the analog switch $SW_3$. The No. 2 set point select instruction is enabled only when the No. 3 set point select instruction is false or "0" thereby causing the priority input $P_2$ to become true. Similarly, the No. 1 set point select instruction is enabled only when the No. 1 select instruction and the No. 3 select instruction are false or "0".

It is needless to say that while, in this embodiment, the highest priority is assigned to the gate A and thus the No. 3 set point select instruction has the highest priority, the circuitry may be suitably modified such that any of the other select instructions has the highest priority as desired. Further, with the priority chain of this embodiment, it is only necessary to add three logical elements for every additional select instruction and thus this embodiment is particularly effective in cases where it is desired to increase the number of select instructions.

We claim:
1. In a set point change-over circuit for changing over the application of set point to a fluid control valve to one of a plurality of predetermined set points in accordance with a set point select instruction from an external control circuit, the combination comprising;
    (a) a plurality of input means each having a preset predetermined set point;
    (b) output means for generating one of said set points for application to said fluid control valve;
    (c) switching means responsive to said set point select instruction to select said one set point to be applied to said fluid control valve from said set points pre- set in said input means and sending the same to said output means; and (d) priority circuit means for sending said set point select instruction from said external control circuit to said switching means, said priority circuit means being responsive to the simultaneous application of two or more set point select instructions from said external control circuit such that only highest-priority one of said two or more set point select instructions is sent to said switching means and the other instructions are ignored.

2. A set point change-over circuit according to claim 1, wherein said priority circuit means comprises a priority encoder for assigning a priority to each of a plurality of set point select instructions received from said external control circuit and coding the same, and a decoder for decoding an output of said encoder to control said switching means.

3. A set point change-over circuit according to claim 1, wherein said priority circuit means comprises a priority chain circuit including a combination of a plurality of logic gate circuits.

4. A set point change-over circuit according to claim 1, wherein said switching means comprises a plurality of analog switches.

* * * * *